US011243318B2

(12) United States Patent
Quevedo et al.

(10) Patent No.: US 11,243,318 B2
(45) Date of Patent: Feb. 8, 2022

(54) METHOD AND APPARATUS FOR UNAMBIGUOUSLY ESTIMATING SEISMIC ANISOTROPY PARAMETERS

(71) Applicant: CGG SERVICES SAS, Massy (FR)

(72) Inventors: Leonardo Quevedo, The Hague (NL); Catalin Tanase, Uitgeest (NL)

(73) Assignee: CGG SERVICES SAS, Massy (FR)

( * ) Notice: Subject to any disclaimer, the term of this patent is extended or adjusted under 35 U.S.C. 154(b) by 509 days.

(21) Appl. No.: 15/622,241

(22) Filed: Jun. 14, 2017

(65) Prior Publication Data

US 2018/0203145 A1    Jul. 19, 2018

Related U.S. Application Data

(60) Provisional application No. 62/445,853, filed on Jan. 13, 2017.

(51) Int. Cl.
*G01V 1/30* (2006.01)
*G01V 1/36* (2006.01)
*G01V 1/38* (2006.01)

(52) U.S. Cl.
CPC .............. *G01V 1/306* (2013.01); *G01V 1/362* (2013.01); *G01V 1/38* (2013.01); *G01V 2210/626* (2013.01)

(58) Field of Classification Search
CPC .................................................... G01V 1/306
See application file for complete search history.

(56) References Cited

U.S. PATENT DOCUMENTS

| 6,901,333 | B2 | 5/2005 | Van Riel et al. | |
| 6,944,094 | B1* | 9/2005 | Thomsen | G01V 1/48 367/57 |
| 8,593,904 | B2 | 11/2013 | Soubaras | |
| 8,792,303 | B2 | 7/2014 | Downton et al. | |
| 2003/0125878 | A1* | 7/2003 | Bakulin | G01V 1/30 702/14 |
| 2011/0222370 | A1* | 9/2011 | Downton | G01V 1/282 367/73 |
| 2015/0063067 | A1* | 3/2015 | Thomsen | G01V 1/282 367/43 |
| 2015/0293245 | A1* | 10/2015 | Mesdag | G01V 1/282 703/2 |

(Continued)

FOREIGN PATENT DOCUMENTS

| EP | 0113944 A1 | 7/1984 |
| WO | 2015014762 A3 | 4/2015 |

OTHER PUBLICATIONS

Andreas Rüger, "Reflection Coefficients and Azimuthal AVO Analysis in Anisotropic Media", Geophysical Monograph Series, 2002, No. 10.

(Continued)

*Primary Examiner* — Raymond L Nimox
(74) *Attorney, Agent, or Firm* — Patent Portfolio Builders PLLC

(57) ABSTRACT

The orientation of the symmetry axis of an underground formation including an HTI layer is determined by comparing azimuthal Fourier coefficient of inversion results in distinct source-receiver azimuth ranges with values expected from the HTI assumption. A branch-stacking technique or prior knowledge may be used to select one of the anisotropy axis orientation values.

20 Claims, 8 Drawing Sheets

(56) References Cited

U.S. PATENT DOCUMENTS

2017/0160413 A1\* 6/2017 Downton ............... G01V 1/307

OTHER PUBLICATIONS

Andrey Bakulin et al., "Estimation of fracture parameters from reflection seismic data—Part I: HTI model due to a single fracture set", Geophysics, Nov.-Dec. 2000, pp. 1788-1802, vol. 65, No. 6.

Boris Gurevich et al., "An analytic model for the stress-induced anisotropy of dry rocks", Geophysics, May-Jun. 2011, pp. WA125-WA133, vol. 76, No. 3.

Colin M. Sayers et al., "Azimuth-dependent AVO in reservoirs containing non-orthogonal fracture sets", Geophysical Prospecting, 2001, pp. 100-106, vol. 49.

Franck Delbecq et al., "A Math-free Look at Azimuthal Surface Seismic Techniques", CSEG Recorder, Jan. 2013, pp. 20-31.

J.A. Hudson, "Wave speeds and attenuation of elastic waves in material containing cracks", Geophys. J. R. astr. Soc., 1981, pp. 133-150, vol. 64.

Jon Downton et al., "Azimuthal Fourier Coefficients", CSEG Recorder, Dec. 2011, vol. 36, No. 10, retrieved from the internet: http://csegrecorder.com/articles/view/azimuthal-fourier-coeffcients.

Mengmeng Zhang et al., "Full data driven azimuthal inversion for anisotropy characterization", SEG International Exposition and 86th Annual Meeting, Oct. 16-21, 2016, pp. 403-407.

Michael Schoenberg, "Elastic wave behavior across linear slip interfaces", J. Acoust Soc. Am, Nov. 1980, pp. 1516-1521, vol. 68, No. 5.

P.R. Mesdag et al., "Updating Low Frequency Model", 72nd EAGE Conference & Exhibition incorporating SPE EUROPEC 2010, Jun. 14-17, 2010.

Extended European Search Report, dated Jul. 6, 2018, from corresponding European Application No. 18305017.8.

Jon Downton et al., "Azimuthal Fourier coefficients: a simple method to estimate fracture parameters", GeoConvention 2012: Vision, May 14, 2012, pp. 1-9.

Thomsen, L.; "Weak elastic anisotropy"; Geophysics, vol. 51, No. 10; Oct. 1986; pp. 1954-1966.

\* cited by examiner

METHOD AND APPARATUS FOR UNAMBIGUOUSLY ESTIMATING SEISMIC ANISOTROPY PARAMETERS

CROSS-REFERENCE TO RELATED APPLICATIONS

The present application is related to and claims the benefit of priority of U.S. Provisional Application 62/445,853 filed Jan. 13, 2017, the entire content of which is incorporated herein by reference.

BACKGROUND

Technical Field

Embodiments of the subject matter disclosed herein generally relate to methods and systems for exploring structure and properties inside an underground formation probed using seismic excitations, and, in particular, to methods and systems for estimating anisotropy parameters associated with a horizontally transverse isotropic layer inside the probed formation.

Discussion of the Background

Probing underground formations in search of hydrocarbon resources is an ongoing process driven by continually increasing worldwide demand. Seismic surveys are used for exploration, hydrocarbon reservoir field development, and production monitoring (time lapse). The probed underground formations are made of volumes of rocks with different attributes (permeability, shear of compression wave velocity, porosity, etc.). Knowledge of the rock permeability is important for hydrocarbon recovery planning and is one of the main objectives of reservoir characterization based on seismic data acquired during seismic surveys. The oil and gas is found in pores and fractures ranging from microscopic fissures to kilometer-wide networks creating complex paths for fluid movement. Just as elastic waves travel faster in the direction of maximum stress or parallel to open fractures, so do fluids. It is therefore valuable to provide permeability anisotropy (i.e. the ease and preferred orientation of fluid flow) as a characterization tool for all kinds of reservoirs. This is particularly useful in the case of unconventional reservoirs, for which developing an extraction plan is challenging due to their complexity and heterogeneity. A significant amount of oil and gas reserves worldwide is trapped in unconventional reservoirs, which are harder to exploit than conventional sandstone or carbonate reservoirs, and for which characterization of anisotropy is a valuable reservoir management tool.

Seismic surveys are performed on land and in marine environments. FIG. 1 illustrates equipment used during a marine seismic survey. A vessel 110 tows plural detectors (also called "seismic sensors") 112, which are disposed along a flexible cable 114 (typically several kilometers long). Those skilled in the art use the term "streamer" (labeled 116) for the cable and its corresponding detectors. A vessel usually tows plural streamers at predetermined cross-line intervals (cross-line being a direction perpendicular to the towing direction), with the streamers forming a spread in the horizontal (xy) plane. Streamer 116 is towed at a substantially constant depth $z_1$ relative to the water surface 118. However, streamers may be towed at a slant (i.e., to form a constant angle) with respect to the water surface, or may have a curved profile as described, for example, in U.S. Pat. No. 8,593,904, the entire content of which is incorporated herein by reference. Each streamer is normally equipped with compasses, acoustic pingers, steering devices (known as "birds") and depth sensors that give continuous location information and control over heading, position and depth.

Vessel 110 (or another vessel) may also tow seismic source 120 configured to generate acoustic waves 122a. Note that, in this document, the terms "acoustic" and "seismic" are interchangeably used to indicate the same type of mechanical energy propagation (i.e., waves). Acoustic waves 122a propagate downward and penetrate the seafloor 124. For simplicity, FIG. 1 shows only two paths 122a corresponding to source-emitted acoustic waves. When encountering a layer interface 126 (the wave propagating with different velocities inside different layers), the acoustic waves are at least partially reflected. The reflection at R is characterized by an incidence/reflection acute angle formed by the incoming or reflected wave and a vertical direction, and an azimuth angle ω (now shown since FIG. 1 is a vertical view and w is in a horizontal plane) between the reflected wave's projection in the horizontal plane and a reference direction (e.g., x-North).

Reflected acoustic waves 122b and 122c propagate upward. Reflected acoustic wave 122b is received by one of detectors 112, while reflected wave 122c passes by the detectors and is reflected back at the water surface 118 (the interface between the water and air serving as a quasi-perfect reflector to mirror acoustic waves). Wave 122d, which is wave 122c's reflection due to the water surface, travels downward and is then also detected. The detectors record amplitude versus time series, known as traces, which are processed to generate a reflectivity image of the underground structure 124 and, in particular, the location of reflectors 126. The traces are recorded as seismic data.

Unlike the marine seismic acquisition system in FIG. 1 in which the detectors are moving while housed inside towed streamers, a water-bottom or a land seismic acquisition system has detectors placed over the water-bottom surface or land surface. In these different data acquisition geometries, the detectors similarly record traces, and the reflections are characterized by incidence and azimuth angles.

Fractures, stress, microcracks, fine-scale layers or mineral grains can cause anisotropy, which may be observed and measured using seismic surveys. Seismic anisotropy means that waves propagate with different velocities in a same layer, depending on the propagation orientation. Rocks are weaker across cracks and also stiffer in the direction of maximum stress. The alignment of weaknesses and stresses causes waves to propagate fastest in the stiffest and slower in the weakest direction respectively.

In anisotropic media, the P-wave and S-wave velocities depend on orientation (i.e., azimuth angle in a horizontal plane). The 1986 article entitled, "Weak elastic anisotropy," by L. Thomsen (published in *Geophysics*, Vol. 51, No. 10, pp. 1,954-1,966, the entire content of which is incorporated herein by reference) describes the simplest anisotropic situation for which velocities change with orientation only in a single particular direction. This is called transverse isotropy (TI) and describes media where wave velocity is independent of orientation within a plane called isotropy plane. A different wave speed occurs in the direction perpendicular to the isotropy plane, which defines the symmetry axis of the media. When the symmetry axis points in the vertical direction the media is said to exhibit vertical transverse isotropy (VTI). Similarly, if the symmetry axis lies in the horizontal, the media is said to exhibit horizontal transverse isotropy (HTI). Common examples of HTI media are materials with vertically aligned fractures or with uneven horizontal stresses. For fractured media with HTI, fracture strike corresponds to the isotropy plane, while the symmetry axis is perpendicular to this isotropy plane, as illustrated in FIG. 2. The anisotropy orientation may be characterized by either the isotropy plane or the symmetry axis azimuth $\Phi$ (not shown since the reference axis is arbitrary). Note that wave velocity in the isotropy plane (i.e., parallel to the crack or the maximum stress orientation) tends to be larger than wave velocity perpendicular to the isotropy plane.

Seismic data processing methods generate reservoir models used to indicate hydrocarbon content and potential recovery from the surveyed underground formations. These methods have lately been improved to include the effects of cracks and background stress (see an overview in Delbecq, F. et al.'s article, "A Math-free Look at Azimuthal Surface Seismic Techniques," published in *CSEG RECORDER*, January 2013, pp. 20-31, the entire content of which is incorporated herein by reference). Most of the methods estimate the physical properties of the subsurface influenced by these effects based on the anisotropic seismic wave propagation they induce. Travel time analysis techniques measure time delays in seismic wave propagation through anisotropic regions and produce estimates of layer properties typically at a low resolution (<10 Hz). Reflectivity analysis techniques measure interface properties based on seismic amplitudes, and produce estimates for physical property changes between layers with respect to a trend. Their typical resolution follows that of seismic excitation frequency range (10-60 Hz) and their results tend be affected by a symmetry in PP reflectivity equations that renders the estimation of fracture or stress orientation ambiguous. Based on the introduction of elastic parameter trends and the integration of inverted contrasts, inversion techniques can overcome some of the limitations regarding orientation ambiguity and produce more reliable estimates of layer properties. This usually comes together with the need for complex nonlinear equation solvers, which increase computational cost and have to be carefully stabilized and checked for potential overfitting in the presence of noisy input data.

Seismic amplitude variation with offset (i.e., distance from source to detector and, implicitly, incidence angle) and azimuth (AVOAz) provides information about fractures' presence and their orientation. Conventional seismic data-processing methods are unable to uniquely determine a fracture's orientation, e.g., yielding two possible solutions 90° apart. This azimuthal ambiguity leads to biases in other anisotropy-related parameter estimates.

There is a need to develop methods and systems that obtain models of an underground structure including fractures without the shortcomings (orientation ambiguity, lack of mathematical stability or artifacts, and high computational cost) of conventional methods.

SUMMARY

Methods and devices according to various embodiments estimate isotropic elastic background parameters and additional parameters characterizing HTI anisotropy from azimuthally varying elastic inversion data. A branch-stacking technique may be applied to average azimuthal Fourier coefficients within a 3D window. Further constraints may be applied to obtain an anisotropy axis and elastic background estimation. These estimates may then be used to linearize the problem of inferring other anisotropy-related parameters (e.g., Thomsen parameters), improving speed and stability control of the solution. Low-frequency modeling of elastic parameters based on well log data enables full-band quantitative analysis, and the introduction of rock physics model constraints such as linear slip theory or Hudson crack models removes the anisotropy ambiguity. A seismic attribute based on a relation between the branch stacking and the anisotropic parameters may be used to facilitate interpretation of anisotropy contrast.

According to an embodiment, there is a method for determining orientation of stress or cracks in an underground formation including an HTI layer. The method includes performing isotropic elastic inversions on portions of seismic data acquired during a seismic survey of the underground formation to obtain values of one or more effective elastic parameters or combinations thereof, the portions of the seismic data corresponding to distinct source-receiver azimuth ranges. The method further includes calculating azimuthal Fourier coefficients, AFCs, for each of the one or more effective elastic parameters or combinations based on the values, and estimating an anisotropy axis orientation by solving equations that correspond a minimization of distance between the calculated AFCs and expected AFCs corresponding to an HTI assumption. The method then includes using the estimated anisotropy axis orientation to design a hydrocarbon production plan.

According to another embodiment there is a data processing apparatus for determining orientation of stress or cracks in an underground formation including a horizontally transverse isotropic. The apparatus has a memory storing program instructions, and a processor. The processor is connected to the memory and is configured to execute the program instructions that cause: performing isotropic elastic inversions on portions of seismic data acquired during a seismic survey of the underground formation to obtain values of one or more effective elastic parameters or combinations thereof, the portions of the seismic data corresponding to distinct source-receiver azimuth ranges; calculating azimuthal Fourier coefficients, AFCs, for each of the effective elastic parameters or combinations based on the values; estimating an anisotropy axis orientation by solving equations that correspond a minimization of distance between the calculated AFCs and expected AFCs corresponding to an HTI assumption; and using the estimated anisotropy axis orientation to design a hydrocarbon production plan.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The inventive concepts to be discussed next are relevant to processing of seismic data acquired in land and marine seismic surveys, and may also be useful in processing and interpreting survey data acquired using electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As already mentioned, the presence and orientation of cracks or stresses is taken into consideration when designing a hydrocarbon extraction plan, and is particularly helpful for unconventional reservoirs. For example, drilling orientation is selected across weaknesses like cracks (as opposed to along stiff directions like parallel to cracks) to efficiently extract the fluids (oil and gas) trapped therein. Seismic data acquired during surveys using seismic excitations are processed to obtain high-quality images of the surveyed underground structures, images that adequately represent the location and orientation of fractures and stresses. The embodiments described in this section provide an analysis that generates such images, including information related to orientation of cracks, stress and anisotropy parameters, thereby improving the efficiency of subsequent hydrocarbons recovery.

Figure 1:
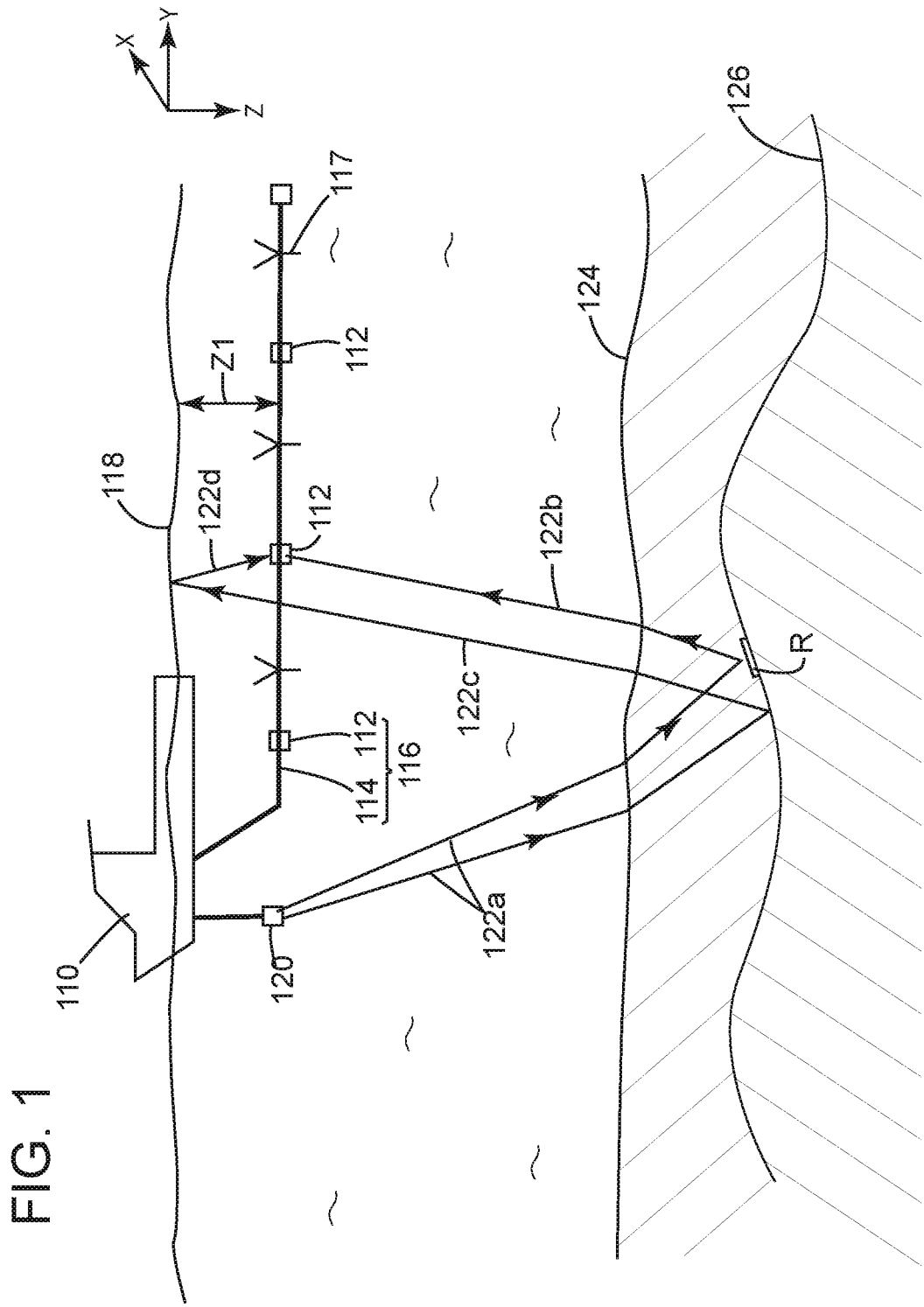
FIG. 1 is a schematic diagram of a marine seismic data acquisition system.
Figure 2:
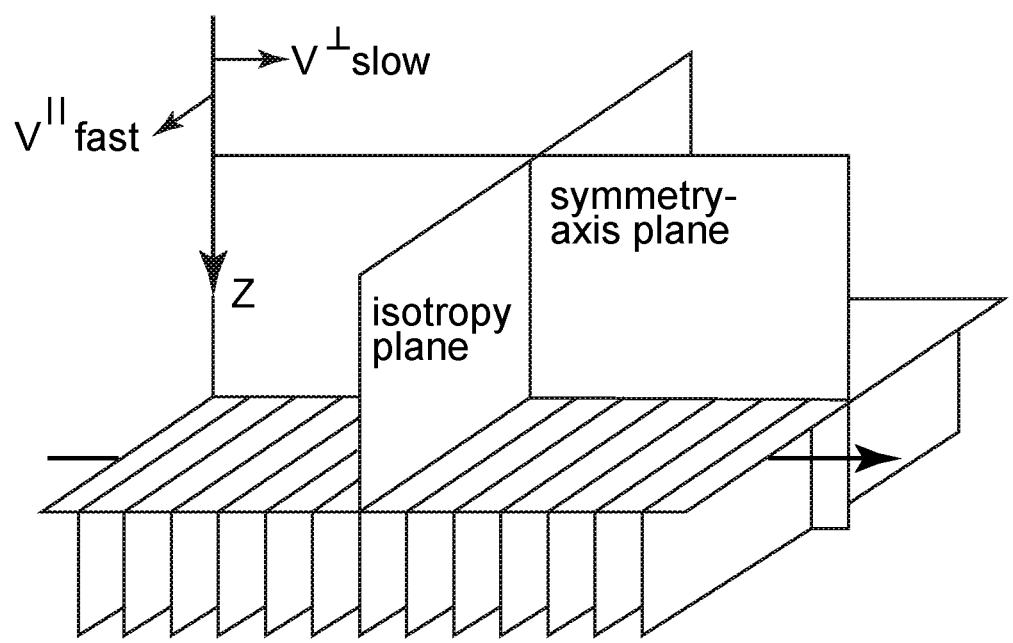
FIG. 2 illustrates the isotropy plane for an HTI layer.
Figure 3:
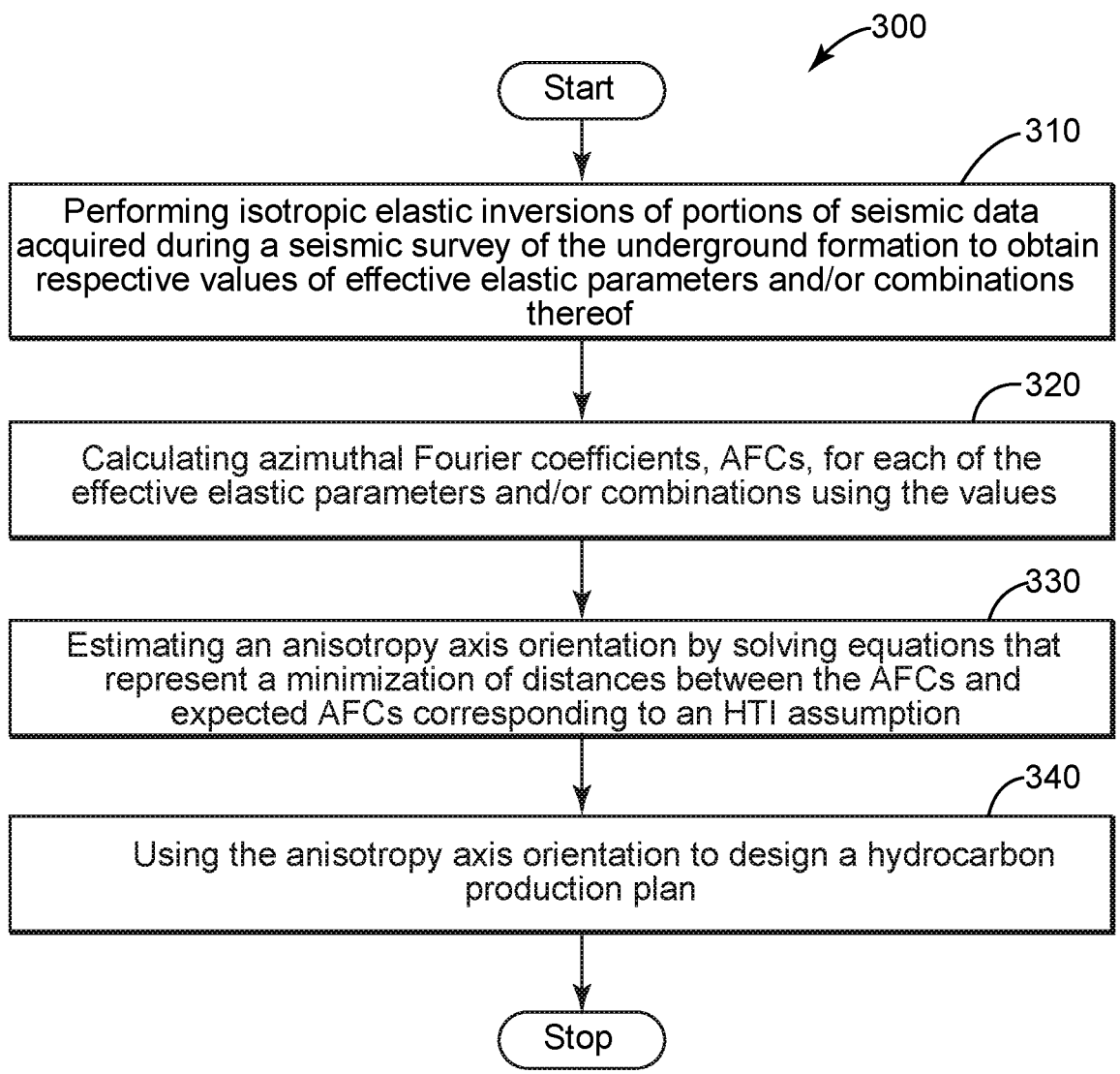
FIG. 3 is a flowchart of a method for determining orientation of cracks in an underground formation including an HTI layer according to an embodiment.

FIG. 3 is a flowchart of a method 300 for determining orientation of anisotropy axis in an underground formation including an HTI layer according to an embodiment. Method 300 includes performing isotropic elastic inversions on portions (e.g., azimuthal sectors) of seismic data acquired during a seismic survey of the underground formation, at 310. These portions correspond to distinct source-receiver azimuth ranges at a location. Six or more preferably evenly distributed azimuth ranges between 0 and $\pi$ are used. The inversions results are values of one or more effective elastic parameters or combinations thereof.

Method 300 further includes calculating azimuthal Fourier coefficients, AFCs, for each of the one or more effective elastic parameters or combinations based on the values at 320. These calculated AFCs $H_n$ should match those expected from HTI symmetry considerations $B_n$. For example, the expected AFCs can be related to an HTI layer characterized by Thomsen-style Rüger-expanded parametrization. Method 300 then includes estimating an anisotropy axis orientation by solving equations that represent a minimization of distance between the calculated AFCs and those stemming from HTI considerations at 330. Finally, the anisotropy axis orientation is used to design a hydrocarbon production plan at 340.

The following description of different embodiments starts with a review of the mathematical basis, definitions and models.

In the previously cited article, Thomsen considered vertical layers of anisotropic media and identified five parameters necessary to characterize anisotropy: P- and S-wave velocity along the vertical symmetry axis and three dimensionless fractional parameters $\gamma$, $\varepsilon$ and $\delta$ (the more these parameters deviate from zero, the more pronounced the anisotropy). In the 2002 monograph entitled, "Reflection coefficients and azimuthal AVO analysis in anisotropic media" (published in *Geophysical monograph series no.* 10, SEG 2002, the entire content of which is incorporated herein by reference), Rüger extended VTI parametrization to HTI using Thomsen-style anisotropic parameters $\gamma^{(v)}$, $\varepsilon^{(v)}$ and $\delta^{(v)}$.

PCT Application WO2015014762 by Mesdag et al. entitled "Method and device for the generation and application of anisotropic elastic parameters in horizontal transverse isotropic (HTI) media" (the entire content of which is incorporated herein by reference) defines anisotropic effective elastic parameters for HTI media, usable in layer property inversion in the presence of anisotropy. HTI-effective parameters enable the use of azimuthal Fourier coefficients (AFCs), a technique traditionally applied to the study of seismic amplitudes, to the results of isotropic inversion. A review of using AFC in the framework of seismic reflectivity analysis is presented in Downton et al.'s article entitled "Azimuthal Fourier Coefficients" published in *CSEG RECORDER*, December 2011, the entire content of which is incorporated herein by reference.

In WO2015014762, based on the weak anisotropy approximation for P-wave reflectivity by Rüger, effective anisotropic elastic parameters are associated with each elastic parameter normally resulting from isotropic inversion as follows:

$$V'_P = (\delta_r^{(V)})^{\cos^2(\omega-\phi)} \left(\frac{\varepsilon_r^{(V)}}{\delta_r^{(V)}}\right)^{\cos^4(\omega-\phi)} V_P \qquad (1)$$

$$\rho' = (\delta_r^{(V)})^{-\cos^2(\omega-\phi)} \left(\frac{\varepsilon_r^{(V)}}{\delta_r^{(V)}}\right)^{-\cos^4(\omega-\phi)} \rho \qquad (2)$$

$$V'_S = \left(\gamma_r^{(V)}\sqrt{\delta_r^{(V)}}\right)^{\cos^2(\omega-\phi)} \left(\frac{\varepsilon_r^{(V)}}{\delta_r^{(V)}}\right)^{\frac{4K+1}{8K}\cos^4(\omega-\phi)} V_S \qquad (3)$$

$$I'_P = I_P \qquad (4)$$

$$I'_S = \left(\frac{\gamma_r^{(V)}\sqrt{\delta_r^{(V)}}}{\delta_r^{(V)}}\right)^{\cos^2(\omega-\phi)} \left(\frac{\varepsilon_r^{(V)}}{\delta_r^{(V)}}\right)^{\frac{1-4K}{8K}\cos^4(\omega-\phi)} I_S \qquad (5)$$

where $V_P$, $\rho$, $V_S$, $I_P$, $I_S$ are the P-wave velocity, S-wave velocity, P-impedance and S-impedance, respectively, $V'_P$, $\rho'$, $V'_S$, $I'_P$, $I'_S$ are the azimuthal effective elastic counterparts, $\varepsilon_r^{(V)}$, $\delta_r^{(V)}$, $\gamma_r^{(V)}$ are the relative Thomsen parameters defined in U.S. Pat. No. 6,901,333 (the entire content of which is incorporated herein by reference) as $$\varepsilon_r^{(V)} = \varepsilon + 1 - \bar{\varepsilon}^{(V)} \qquad (6)$$

and similarly for other Thomsen parameters, with $\bar{\varepsilon}_r^{(V)}$, $\bar{\delta}_r^{(V)}$, $\bar{\gamma}_r^{(V)}$ being the local averages of the Thomsen parameters as defined in Bakulin's 2000 article entitled, "Estimation of fracture parameters from reflection seismic data—Part I: HTI model due to a single fracture set" (published in Geophysics, Vol. 65, No. 6, pp. 1, 788-1,802, the entire content of which is incorporated herein by reference). Further, $K=(\overline{V}_s/\overline{V}_p)$ corresponds to the squared ratio of the local averages of the isotropic S-wave and P-wave velocities, $\omega$ is the azimuth angle of the source-receiver pair in the seismic acquisition, and $\phi$ is the azimuth of the symmetry axis of the HTI media.

Applying logarithm function to equations (1)-(5) yields the following type of relationships:

$$\ln P' = b_0 + b_1 \cos[2(\omega-\phi)] + b_2 \cos[4(\omega-\phi)] \quad (7)$$

where P' is any of $V'_P$, $\rho'$, $V'_S$, $I'_P$, $I'_S$. The coefficients $b_n$, with n=0, 1, 2 for the HTI case are linear functions of the Thomsen parameters, $b_0$ also depending on ln P. A discrete Fourier transform (DFT) of equation (7) for six or more evenly distributed azimuths between 0 and $\pi$ leads to a sequence of complex Fourier coefficients ($B_0$, $B_1$, $B_2$, ...) for each effective elastic parameter, from which the coefficients $b_n$ and the anisotropy axis orientation (i.e., angle $\phi$ in equation (7)) can be approximated by their magnitude and phase $$B_0 = b_0 \quad (8)$$

$$B_1 = \frac{1}{2} b_1 e^{-2i\phi} \quad (9)$$

$$B_2 = \frac{1}{2} b_2 e^{-4i\phi} \quad (10)$$

$$B_n = 0, n>2. \quad (11)$$

Note that the signs of $b_1$ and $b_2$ are meaningful.

For the values of the effective elastic parameters resulting from the six or more azimuthally independent inversions, a DFT yields complex coefficients ($H_0$, $H_1$, $H_2$, ...)

$$H_n = h_n e^{i\phi_n}, \, h_n > 0. \quad (12)$$

These coefficients describe the anisotropic modulation of an effective elastic parameter (or combination thereof), but are not constrained to any model describing the anisotropy and, therefore, have independent phases. To fit a particular anisotropy assumption such as HTI represented by the relationship (7), the difference (i.e., distance in an n-dimensional space or sum of distances squared) between the AFCs related to that assumption as described by equations (8)-(11) and the measured coefficients from (12) has to be minimized. This difference is represented by a penalty function $$S = \Sigma_n |B_n(\phi) - H_n(\phi_n)|^2. \quad (13)$$

The minimization leads to the following system of equations:

$$\frac{\partial S}{\partial \phi} = 4 b_1 h_1 \sin(2\phi + \phi_1) + 8 b_2 h_2 \sin(4\phi + \phi_2) = 0 \quad (14)$$

$$\frac{\partial S}{\partial b_0} = 2(b_0 - h_0) = 0 \quad (15)$$

$$\frac{\partial S}{\partial b_1} = b_1 - 2 h_1 \cos(2\phi + \phi_1) \quad (16)$$

$$\frac{\partial S}{\partial b_2} = b_2 - 2 h_2 \cos(4\phi + \phi_2). \quad (17)$$

If equations (16) and (17) are substituted in equation (14), it results in an equation of the type $$\sin(x) + A \sin(2x+\Delta) = 0 \quad (18)$$

with $x = 2(2\phi + \phi_1)$, $A = 2(h_2/h_1)^2$ and $\Delta = 2(\phi_2 - 2\phi_1)$.

Equation (18) may be numerically solved to obtain an estimation of the anisotropy axis orientation $\phi$. Although a numerical solution can be obtained in a variety of standard ways to a fixed precision, equation (18) suggests that each of the complex phases ($\phi_1$, $\phi_2$) that occur in defining the anisotropy axis orientation is weighted by a corresponding magnitude ($h_1$, $h_2$). Therefore, a good initial approximation for the anisotropy axis orientation may be the phase of the complex coefficient with the greatest magnitude.

Figure 4:
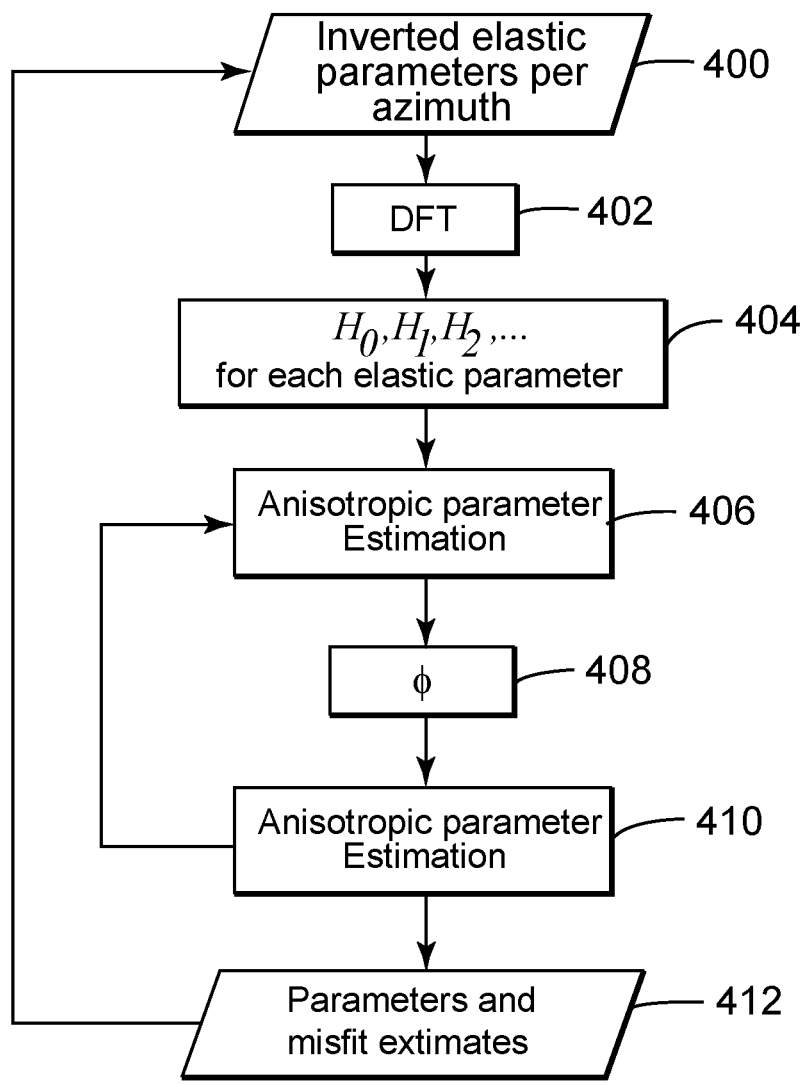
FIG. 4 is a diagram of seismic data processing according to an embodiment.

FIG. 4 is a diagram of seismic data processing according to an embodiment. The seismic data processing in FIG. 4 is consistent with the flowchart in FIG. 3. The anisotropy parameters that may be calculated using an estimated value of the anisotropy axis orientation are combinations of components of the stiffness matrix used to characterize anisotropic materials such as the Thomsen parameters, or parameters of anisotropic models such as the tangential and normal weaknesses of linear slip theory, or the crack density and fluid factors of Hudson's penny shape crack models. For a review of these quantities, refer to the previously mentioned Delbecq article.

Block 400 in FIG. 4 represents the results of the isotropic elastic inversions performed on portions of seismic data corresponding to distinct source-receiver azimuth ranges (i.e., azimuthal sectors). One or more effective elastic parameters such as $V'_P$, $\rho'$, $V'_S$, $I'_P$, $I'_S$ or combinations thereof result from applying an isotropic seismic inversion technique on each azimuthal sector of the seismic survey. Note that using such standard isotropic seismic inversion techniques on the different portions may yield an azimuthal modulation of inversion results (e.g., the density) that should otherwise be azimuthally invariant.

A DTF applied to the inversion results from six or more azimuthally independent inversions within a 0 to $\pi$ azimuth range is represented at step 402 and yields AFCs ($H_0$, $H_1$, $H_2$, ...) represented by box 404. As already mentioned, these complex AFCs are completely general and, therefore, have independent phases. At step 406, equations that correspond to a minimization of distance between the calculated AFCs and the expected AFCs for HTI are numerically solved to obtain an estimate of the anisotropy axis orientation $\phi$.

In step 408, a best fit for the anisotropy axis orientation is selected as the phase of the complex coefficient with the greatest magnitude. This selected value is then used in equations (15)-(17) to retrieve the coefficients $b_n$ in step 410. These coefficients may be used as input to 406, thus iteratively improving the fit for the anisotropy axis orientation.

A set of coefficients $b_n$ and the selected axis orientation $\phi$ represented by box 412 describe the HTI layer. The description may be used as input (i.e., initial values) for repeating the inversions at 400 and the following steps to improve the description. The iterations of 406-408 and 400-412 may be repeated until a criterion related to a residual distance is met.

Equation (16) highlights a problem common to all parameter estimation methods based on P-wave reflectivity: if the anisotropy axis 4 is shifted by 90° and at the same time the sign of $b_1$ is changed, then a numerically different fit just as good as the original one is obtained. Similarly, equation (17) has an analogous symmetry for a 45° shift. These alternative solutions are known as branches. The branches cause a particular challenge when attempting to increase the statistical significance of the fit by adding more samples through an averaging procedure, because AFCs of opposite branches tend to interfere destructively. In order to overcome this interference problem, an algorithm known as "branch-stacking" may be applied as a part of step 406.

Figure 5:
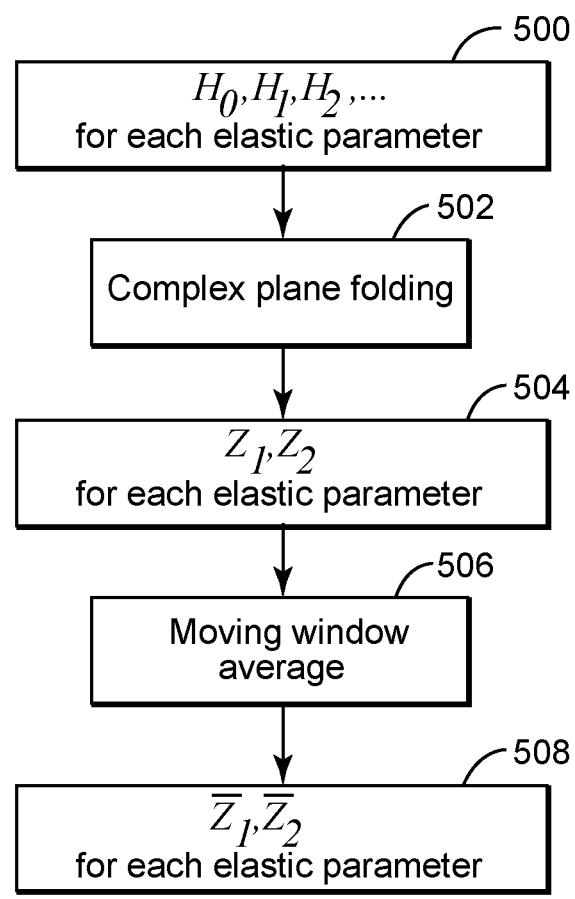
FIG. 5 is a diagram illustrating branch stacking according to an embodiment.

The branch-stacking algorithm is illustrated in FIG. 5. Starting from the model-independent AZCs represented by box 500, a complex plane mapping of each of the terms of equation (12) occurs at step 502, according to the following equation:

$$Z_n = \frac{(H_n)^{2n}}{|H_n|^{2n-1}} \qquad (19)$$

or more explicitly $$Z_0 = H_0, Z_1 = \frac{(H_1)^2}{|H_1|}, Z_2 = \frac{(H_2)^4}{|H_2|^3}. \qquad (20)$$

In general, the mapping (19) in step 502 folds the complex plane as many times as needed to add all branches of the fit together, leading to the complex quantities $Z_1$, $Z_2$ represented by box 504. After summing contributions from a definite set of neighboring samples in a user-defined 3D window at step 506, the stacked coefficients represented by box 508 are output. The phases of the complex averaged-stacked coefficients $\overline{Z}_n = \overline{z}_n e^{i\overline{\varphi}_n}$ are less sensitive to the destructive interference of opposite branches than the direct average of AFC $\overline{H}_n = \overline{h}_n e^{i\overline{\phi}_n}$, and provide a better estimate of the anisotropy axis 4 through the equation (18) following the approach described in step 406.

Figure 6:
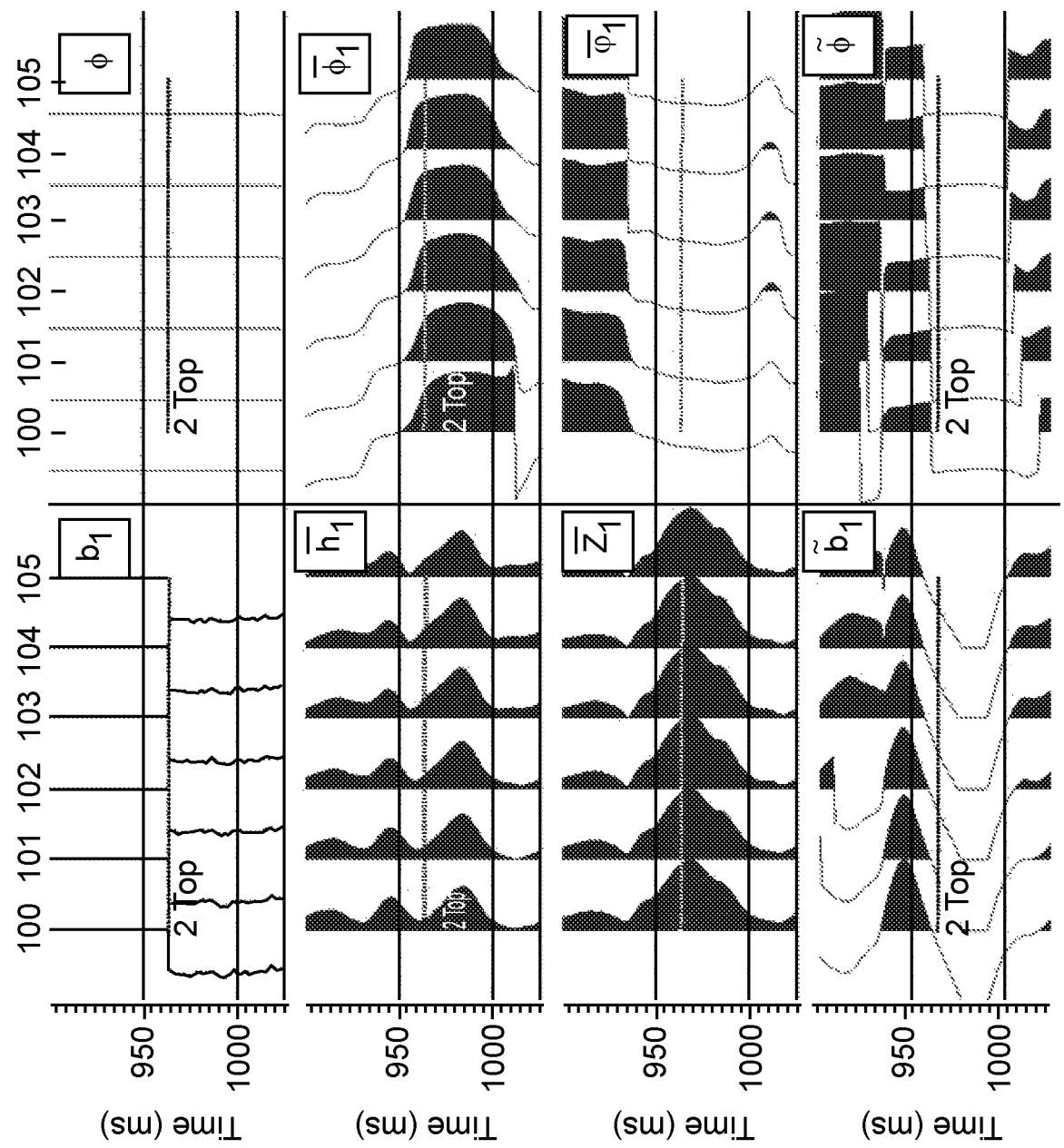
FIG. 6 is a set of graphs showing the effect of branch stacking on synthetic data.

FIG. 6 is a set of graphs organized to compare estimations obtained from a model with known values of $b_1$ and $\phi$ illustrated on the first two graphs. All the graphs in FIG. 6 have as vertical axis time (corresponding to depth) in ms, and identifiers 100-105 label different seismic traces pertaining to an arbitrary seismic line in the model. Synthetic seismic azimuthal stacks have been generated based on the model illustrated in the first-row (top) graphs, and the isotropic inversion has been performed on each of the stacks to obtain the inverted elastic parameters per azimuth sectors as in step 400. DFT applied to these parameters (as in step 402) yields model-independent AFCs represented by box 404. A moving average window is then applied to smooth out the data, yielding the average coefficients of $\overline{h}_1$ and $\overline{\phi}_1$ illustrated on the second-row graphs in FIG. 6. Note that the anisotropy contrast present at the interface denoted by the label 2Top in all graphs coincides with a change in solution branch evident in $\overline{\phi}_1$ as a smooth phase jump. Consequently, the estimated magnitude $\overline{h}_1$ drops to zero at the interface due to a destructive interference.

In contrast, the branch-stacking algorithm in FIG. 5 results in the magnitude $\overline{z}_1$ and phase $\overline{\varphi}_1$ shown on the third row of graphs in FIG. 6. In this case, the solution branch is the same across the 2Top interface, as evidenced by the near-constant value of $\overline{\varphi}_1$. Therefore, the quantity $\overline{z}_1$ has a maximum precisely at the interface. Since all solution branches have been stacked, ambiguity in the determination of the anisotropy axis orientation results in the estimated value $\tilde{b}_1$ of $b_1$ that may change its sign across the 2Top interface, as illustrated in the last row of graphs in FIG. 6. To resolve this ambiguity without resorting to other data sources, a model constraint has to be applied to the coefficients $b_n$, or prior knowledge of $\phi$ may be used to pick the closest branch. Unfortunately, due to the lack of low frequencies in the elastic parameter inversion, such strategies to remove the ambiguity are insufficient.

As explained in Mesdag et al.'s article, "Updating Low Frequency Model," published in *Proceedings of the 72nd EAGE Conference & Exhibition incorporating SPE EUROPEC* 2010, Barcelona, Spain, June 2010, pp. 14-17 (the entire content of which is incorporated herein by reference), when low-frequency information is unavailable, inversion around high-contrast layers such as the one shown in FIG. 6 is prone to artifacts such as the side lobes seen around the 2Top interface in the $\overline{h}_1$, $\overline{z}_1$ and $\tilde{b}_1$ graphs. The locations of anisotropy contrasts do not coincide in general with the structural interfaces commonly obtained by seismic interpretation. It is, therefore, useful to define attributes that can assist in the interpretation of such layers. The peaks of $\overline{z}_1$ and the 0-crossings of $\tilde{b}_1$ in the graphs in FIG. 6 may be used for this purpose. Additionally, a two-sided signal for $\tilde{b}_1$ may also result from side lobes when picking the solution branch through comparison with a prior knowledge of $\phi$. Other possible attributes may be found by shifting the estimation of $\phi$ whenever the sign of $\tilde{b}_1$ is positive (or negative). The bottom graphs in FIG. 6 illustrate the shifted signal $\tilde{\phi}$, which corresponds to the estimated anisotropy axis consistent with a purely negative $\tilde{b}_1$. The sharp jumps in azimuth angle in this case may also be used to interpret the location of the contrast.

Zhang et al.'s 2016 article entitled, "Full data driven azimuthal inversion for anisotropy characterization," published in *Proceedings of the SEG International Exposition and 87th Annual Meeting* (the entire content of which is incorporated herein by reference) describes methods that use the interpreted location and magnitude of the anisotropy contrast from $\tilde{b}_1$ and well information, if available, to produce a low-frequency model of the anisotropy that can be fed back into the inversions at step 400 in FIG. 4. This type of iteration leads to full-band AFCs, which can then be used to extract anisotropy parameters quantitatively and unambiguously.

For the sake of clarity, the description above referred to Thomsen-type parameters set forth in equations (1)-(5). However, in fact, other anisotropic effective parameters $P'^i = (V'_P, \rho', \ldots)$ may be used. The penalty function in equation (13) is then generalized to $$S = \Sigma_{n,i} |B_n^i(\phi) - H_n^i(\phi_n^i)|^2 \text{ with } i=1, \ldots, N_{types} \qquad (21)$$

where $B_n^i$ represents the coefficients in (8)-(11) for each parameter. Minimizing the penalty function then yields the following more complex expression for determining the anisotropy axis orientation:

$$\frac{\partial S}{\partial \phi} = \sum_i \left[ 4(h_1^i)^2 \sin2(2\phi + \phi_1^i) + 8(h_2^i)^2 \sin2(4\phi + \phi_2^i) \right] = 0. \qquad (22)$$

The above equation can be numerically solved to obtain an estimation of the anisotropy axis orientation $\phi$. Branch-stacking average and the largest AFCs criteria may be used in this estimation.

In a broader view, the outcome of various methods similar to the one described above is describing an anisotropic layer in terms of anisotropy axis orientation $\phi$ and anisotropy model parameters (for example, but not limited to, Thomsen parameters in HTI assumption).

Stress or fracture models may restrict the parameter space to smaller subspaces, resulting in linear relationships. For example, for Thomsen parameters in HTI assumption, the linear relationships have the following generalized form:

$$T_a = C_{a\mu} M_\mu \tag{22}$$

where $$T_a = \begin{pmatrix} \gamma^{(V)} \\ \delta^{(V)} \\ \varepsilon^{(V)} \end{pmatrix} \tag{23}$$

is a vector whose elements are the Thomsen parameters, C is a 3×1, 3×2 or 3×3 matrix, and $M_\mu$ is a 1-, 2- or 3-dimensional vector of model parameters.

Models that produce relationships as in formula (22) include linear slip theory, Hudson penny shape crack models with or without fluid effects, and some stress-induced models of anisotropy as described in Bakulin et al.'s article entitled, "Estimation of fracture parameters from reflection seismic data—Part I: HTI model due to a single fracture set," published in *Geophysics*, Vol. 65, No. 6, pp. 1, 788-1, 802, and Gurevich et al.'s article entitled, "An analytic model for the stress-induced anisotropy of dry rocks," published in *Geophysics*, Vol. 76, No. 3, pp. WA125-WA133 (the entire contents of which are incorporated herein by reference).

The relationships between the coefficients ($b_0^i$, $b_1^i$, $b_2^i$) and the Thomsen parameters of the HTI assumption can be extracted from equations (1)-(5) as linear system $$b_n^i = D_{na}^i T_a + \delta_{n0} \ln P^i \tag{24}$$

where $\delta_{nm}$ is the Kronecker delta and $D_{na}^i$ are matrices that depend on $K=(\nabla_s/\nabla_p)^2$.

Similarly, for the models described by (12), the linear system turns into $$b_n^i = E_{n\mu}^i M_\mu + \delta_{n0} \ln P^i \tag{25}$$

with $E_{n\mu}^i = D_{na}^i C_{a\mu}$.

For both (24) and (25), minimizing the penalty function yields systems of non-linear equations $$\left( \frac{\partial S}{\partial P^i}, \frac{\partial S}{\partial T_a}, \frac{\partial S}{\partial \phi} \right) = 0 \tag{26}$$

or $$\left( \frac{\partial S}{\partial P^i}, \frac{\partial S}{\partial M_\mu}, \frac{\partial S}{\partial \phi} \right) = 0 \tag{27}$$

which may be solved iteratively, starting from a suitable initial set of values.

Figure 7:
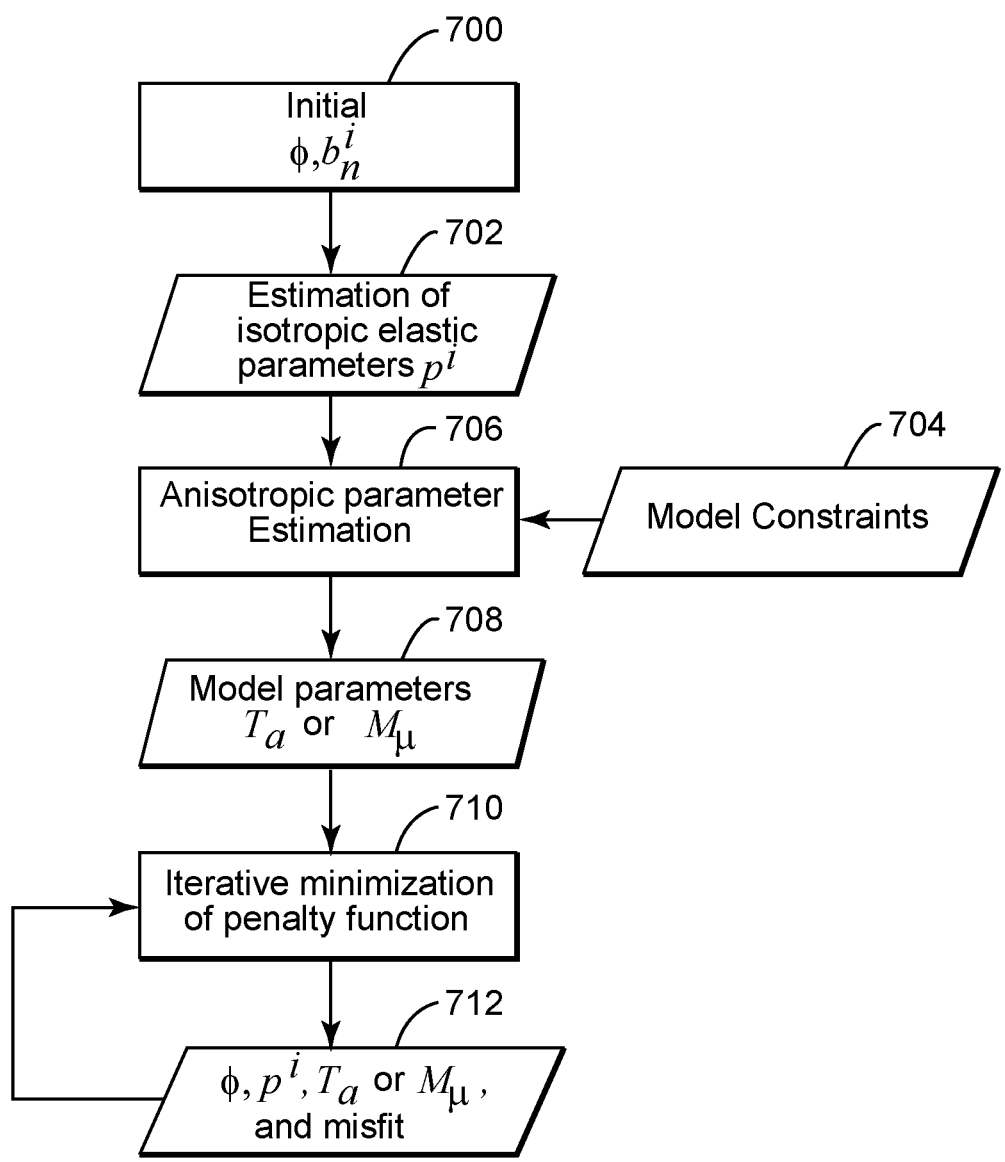
FIG. 7 is a diagram illustrating an embodiment of step 410 in FIG. 4.

FIG. 7 illustrates an embodiment of step 410 in FIG. 4 in which anisotropy parameters estimates are obtained after determining the anisotropy axis orientation by numerically solving equation (22). The anisotropy axis orientation ϕ and an initial set of values for $b_n^i$ as represented by box 700 are the starting point for estimating the anisotropy parameters.

Trigonometric manipulations of equations (1)-(5) lead to an expression $$\ln P^{ri} = \ln P^i + a_1^i \cos^2(\omega - \phi) + a_2^i \cos^4(\omega - \phi) \tag{28}$$

where the coefficients $a_1^i$ and $a_2^i$ are related to $b_n^i$ according to $$b_0^i = \ln P + \frac{1}{2} a_1^i + \frac{3}{8} a_2^i \tag{29}$$

$$b_1^i = \frac{1}{2} a_1^i + \frac{1}{2} a_2^i \tag{30}$$

$$b_2^i = \frac{1}{8} a_2^i \tag{31}$$

and, at 702, the initial values of the isotropic elastic parameters are estimated as $$P^i = \exp(b_0^i - b_1^i + b_2^i). \tag{31}$$

The values of $b_n^i$ and $P^i$ are substituted in equations (24) or (25), depending on the choice of model. Constraints represented by box 704 lead to linear systems that can be directly solved in step 706 to obtain estimates of the model parameters $T_\alpha$ or $M_\mu$ in step 708.

At 710, the penalty function may then be minimized iteratively (i.e., solving equations (26) or (27)) to obtain improving (with decreasing misfit) sets of anisotropy axis orientation, isotropic elastic parameters and anisotropy model parameters 712, as appropriate. The iterations stop when a misfit-related criterion is met.

The above methods rely on penalty function minimization, but the branch-stacking average and its associated seismic attribute enhance the anisotropy axis orientation estimation by solving or approximating (28) and applying model-related constrains based on (24) and (25) leading to (26) and (27). Unlike the previous approach, the AFCs are calculated for effective elastic parameter values obtained from inversion of the seismic data and not calculated directly for the seismic data.

Figure 8:
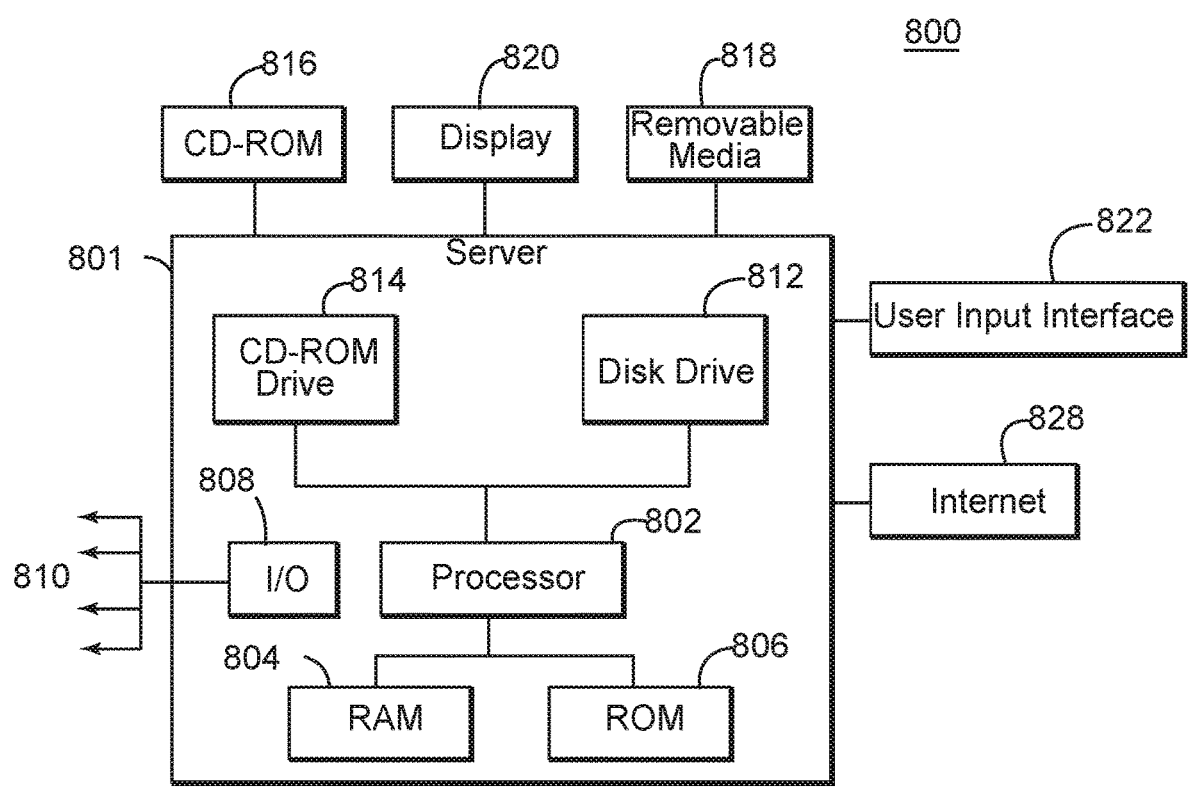
FIG. 8 is a block diagram of a data processing apparatus according to an embodiment.

The above-discussed methods may be implemented in a computing device 800 as illustrated in FIG. 8. Hardware, firmware, software or a combination thereof may be used to perform the various steps and operations described herein.

Exemplary computing device 800 suitable for performing the activities described in the exemplary embodiments may include a server 801. Server 801 may include a central processor (CPU) 802 coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, detectors, etc. The server may be part of a larger network configuration as in a global area network (GAN) such as the Internet 828, which allows ultimate connection to various computing devices.

The disclosed exemplary embodiments provide methods for designing or adjusting a production plan based on orientation of stress or cracks in an underground formation. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for planning hydrocarbon extraction from an underground formation including a horizontally transverse isotropic, HTI, layer, the method comprising:
    performing isotropic elastic inversions on portions of seismic data acquired during a seismic survey of the underground formation to obtain values of one or more effective elastic parameters or combinations thereof, the portions of the seismic data corresponding to distinct source-receiver azimuth ranges;
    calculating azimuthal Fourier coefficients, AFCs, for each of the one or more effective elastic parameters or combinations based on the values;
    unambiguously estimating an anisotropy axis orientation by solving equations that correspond to a minimization of a distance between the calculated AFCs and expected AFCs corresponding to an HTI assumption; and
    using the estimated anisotropy axis orientation to drill for hydrocarbon production taking into consideration orientation of stress and/or cracks as indicated by the anisotropy axis orientation thereby improving efficiency of hydrocarbon production.

2. The method of claim 1, wherein the estimating of the anisotropy axis orientation includes applying branch-stacking to average AFCs within a 3D window yielding a seismic attribute that indicate a most likely value of the anisotropy axis orientation.

3. The method of claim 2, wherein the seismic attribute is maximum for the most likely value of the anisotropy axis orientation.

4. The method of claim 2, wherein the seismic attribute changes sign for the most likely value of the anisotropy axis orientation.

5. The method of claim 1, further comprising:
    inferring anisotropy parameters using the anisotropy axis orientation, wherein the inferred anisotropy parameters are also used for designing the hydrocarbon production plan.

6. The method of claim 5, wherein the estimating of the anisotropy axis orientation and the inferring of the anisotropy parameters are iterated until a criterion related to a residual distance is met.

7. The method of claim 5, wherein the estimated anisotropy axis orientation and the inferred anisotropy parameters are used as initial values to repeat performing the isotropic elastic inversions on the portions of the seismic data, calculating the AFCs, estimating the anisotropy axis orientation, and inferring the anisotropy parameters until a criterion related to a residual distance is met.

8. The method of claim 1, wherein a Thomsen-type HTI assumption is employed to calculate the expected AFCs and the minimization refers to $$S = \sum_{n,i} |B_n^i(\phi) - H_n^i(\phi_n^i)|^2$$

subject to $b_n^i = D_{na}^i T_a + \delta_{n0} \ln P^i$, where $b_n^i$ are generic HTI coefficients, $P^i$ are elastic parameters, $\delta_{nm}$ is the Kronecker delta and $D_{na}^i$ are matrices that depend on $K=(\nabla_s/\nabla_p)^2$, averages of secondary and primary wave propagation velocities.

9. The method of claim 1, wherein the distinct source-receiver azimuth ranges are substantially equal, and divide a range of 0 to $\pi$ in at least six sectors.

10. The method of claim 1, wherein the distinct source-receiver azimuth ranges divide a range of 0 to $\pi$ in sectors of uneven size for which the data is resampled or re-binned in the azimuthal dimension to become six or more regular sectors.

11. The method of claim 1, wherein the calculating of the AFCs includes a moving window average.

12. The method of claim 1, wherein the estimating of the anisotropy axis orientation includes selecting a solution value based on additional information.

13. A data processing apparatus for planning hydrocarbon extraction from an underground formation including a horizontally transverse isotropic, HTI, layer, comprising:
    a memory storing program instructions; and
    a processor connected to the memory and configured to execute the program instructions that cause:
        performing isotropic elastic inversions on portions of seismic data acquired during a seismic survey of the underground formation to obtain values of one or more effective elastic parameters or combinations thereof, the portions of the seismic data corresponding to distinct source-receiver azimuth ranges;
        calculating azimuthal Fourier coefficients, AFCs, for each of the effective elastic parameters or combinations based on the values;
        unambiguously estimating an anisotropy axis orientation by solving equations that correspond a minimization of distance between the calculated AFCs and expected AFCs corresponding to an HTI assumption; and
        control drilling using the estimated anisotropy axis orientation to take into consideration orientation of stress and/or cracks as indicated by the anisotropy axis orientation thereby improving efficiency of hydrocarbon production.

14. The apparatus of claim 13, wherein the estimating of the anisotropy axis orientation includes applying branch-stacking to average AFCs within a 3D window yielding a seismic attribute that indicate a most likely value of the anisotropy axis orientation.

15. The apparatus of claim 14, wherein the seismic attribute is maximum for the most likely value of the anisotropy axis orientation.

16. The apparatus of claim 14, wherein the seismic attribute changes sign for the most likely value of the anisotropy axis orientation.

17. The apparatus of claim 13, wherein the processor executing the program instructions further performs:
   inferring anisotropy parameters using the anisotropy axis orientation, wherein the inferred anisotropy parameters are also used for designing the hydrocarbon production plan.

18. The apparatus of claim 17, wherein the processor executing the program instructions iterates estimating the anisotropy axis orientation and inferring the anisotropy parameters until a criterion related to residual distance is met.

19. The apparatus of claim 17, wherein the processor executing the program instructions uses the estimated anisotropy axis orientation and the inferred the anisotropy parameters as initial values to repeat performing the isotropic elastic inversions on the portions of the seismic data, calculating the AFCs, estimating the anisotropy axis orientation, and inferring the anisotropy parameters until a criterion related to residual distance is met.

20. The apparatus of claim 13, wherein a Thomsen-type HTI assumption is employed to calculate the estimates of the AFCs and the minimization refers to $$S = \sum_{n,i} |B_n^i(\phi) - H_n^i(\phi_n^i)|^2$$

subject to $b_n^i = D_{na}^i T_a + \delta_{n0} \ln P^i$, where $b_n^i$ are generic HTI coefficients, $P^i$ are elastic parameters, $\delta_{nm}$ is the Kronecker delta and $D_{na}^i$ are matrices that depend on $K=(\overline{V}_s/\overline{V}_p)^2$, averages of secondary and primary wave propagation velocities.

\* \* \* \* \*